(12) United States Patent
Jung et al.

(10) Patent No.: US 10,390,349 B2
(45) Date of Patent: Aug. 20, 2019

(54) 256 QAM-BASED RESOURCE ALLOCATION METHOD AND BASE STATION THEREOF

(71) Applicant: LG ELECTRONICS INC., Seoul (KR)

(72) Inventors: Manyoung Jung, Seoul (KR); Yoonoh Yang, Seoul (KR); Sangwook Lee, Seoul (KR); Suhwan Lim, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 316 days.

(21) Appl. No.: 15/126,579

(22) PCT Filed: Feb. 4, 2015

(86) PCT No.: PCT/KR2015/001159
§ 371 (c)(1),
(2) Date: Sep. 15, 2016

(87) PCT Pub. No.: WO2015/147442
PCT Pub. Date: Oct. 1, 2015

(65) Prior Publication Data
US 2017/0099669 A1   Apr. 6, 2017

Related U.S. Application Data

(60) Provisional application No. 61/969,830, filed on Mar. 25, 2014.

(51) Int. Cl.
*H04W 72/08* (2009.01)
*H04L 5/00* (2006.01)
(Continued)

(52) U.S. Cl.
CPC ............ *H04W 72/08* (2013.01); *H04L 1/0003* (2013.01); *H04L 1/0009* (2013.01); *H04L 5/006* (2013.01);
(Continued)

(58) Field of Classification Search
CPC ...................................................... H04W 72/08
See application file for complete search history.

(56) References Cited

U.S. PATENT DOCUMENTS

2010/0035645 A1*  2/2010  Chang ................. H04W 52/146
455/522
2012/0276896 A1   11/2012  Ren et al.
(Continued)

FOREIGN PATENT DOCUMENTS

EP       2693815 A1    2/2014

OTHER PUBLICATIONS

Nokia et al., "Effect of eNB power back-off on 256QAM system performance", 3GPP TSG-RAN WG1 Meeting #75, R1-135583, Nov. 2, 2013, 7 Pages.
(Continued)

*Primary Examiner* — John D Blanton
(74) *Attorney, Agent, or Firm* — Lee Hong Degerman Kang Waimey

(57) ABSTRACT

One embodiment of the present specification provides a method for allocating resources to user equipment (UE) supporting 256 quadrature amplitude modulation (QAM) demodulation. The resource allocation method can comprise the steps of: receiving a channel quality information (CQI) report from the UE; determining, by the UE, whether a backoff of transmission power has been applied to a downlink subframe from which CQI is measured; determining whether the backoff of the transmission power is to be applied to the downlink subframe which is supposed to
(Continued)

allocate the resources; and determining a modulation coding scheme (MCS) level on the basis of the CQI and the results of the determination.

6 Claims, 11 Drawing Sheets

(51) Int. Cl.
*H04W 52/26* (2009.01)
*H04W 52/34* (2009.01)
*H04L 1/00* (2006.01)
*H04W 52/36* (2009.01)

(52) U.S. Cl.
CPC ......... *H04W 52/262* (2013.01); *H04W 52/34* (2013.01); *H04W 52/365* (2013.01)

(56) References Cited

U.S. PATENT DOCUMENTS

| | | | |
|---|---|---|---|
| 2013/0028309 A1 | 1/2013 | Park et al. | |
| 2015/0085767 A1* | 3/2015 | Einhaus | H04L 1/0001 |
| | | | 370/329 |
| 2015/0098392 A1* | 4/2015 | Homchaudhuri | H04W 48/20 |
| | | | 370/329 |
| 2016/0315679 A1* | 10/2016 | Murakami | H04L 5/00 |

OTHER PUBLICATIONS

Nokia et al., "On operation of 256QAM with dynamic eNB power backoff", 3GPP TSG-RAN WG1 Meeting #76, R1-140556, Jan. 31, 2014, 3 Pages.

\* cited by examiner

256 QAM-BASED RESOURCE ALLOCATION METHOD AND BASE STATION THEREOF

CROSS-REFERENCE TO RELATED APPLICATIONS

This application is the National Stage filing under 35 U.S.C. 371 of International Application No. PCT/KR2015/001159, filed on Feb. 4, 2015, which claims the benefit of U.S. Provisional Application No. 61/969,830, filed on Mar. 25, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in a next-generation mobile communication system, it is expected that a small cell having a small cell coverage radius is added within a coverage of a macro cell.

Further, in a next-generation mobile communication system, high-order modulation, for example, 256 quadrature amplitude modulation (QAM), may be improved to be used for a small cell.

However, 256 QAM is possible only in a small cell with low transmission power but is doubtful for a base station having transmission power greater than a small-cell base station due to different reasons.

SUMMARY OF THE INVENTION

Accordingly, an object of the present invention is to solve the above-mentioned problems.

To achieve the foregoing object, one disclosure of the present specification may provide a method for allocating a resource to a user equipment (UE) that supports 256 quadrature amplitude modulation (QAM) demodulation. The method for allocating the resource may include: receiving a channel quality information (CQI) report from the UE; determining whether a backoff of transmit power has been applied to a downlink subframe in which CQI is measured by the UE; determining whether a backoff of transmit power is to be applied to a downlink subframe in which resource allocation is to be performed; and determining a modulation coding scheme (MCS) level based on the CQI and determining results.

The method may further include performing resource allocation using a lower MCS level when the backoff of the transmit power has not been applied to the downlink subframe in which the CQI is measured by the UE and the backoff of transmit power is to be applied to the downlink subframe in which resource allocation is to be performed.

The method may include calculating a backoff value based on the received CQI; determining an offset in CQI based on the backoff value; and determining a lower MCS level corresponding to the offset when the backoff of the transmit power has not been applied to the downlink subframe in which the CQI is measured by the UE and the backoff of transmit power is to be applied to the downlink subframe in which resource allocation is to be performed.

The method may further include performing resource allocation using a higher MCS level when the backoff of the transmit power has been applied to the downlink subframe in which the CQI is measured by the UE and the backoff of transmit power is not to be applied to the downlink subframe in which resource allocation is to be performed.

The method may include determining an offset in CQI based on a value of the backoff; and determining a higher MCS level corresponding to the offset.

To achieve the foregoing object, one disclosure of the present specification may provide a base station (BS) for allocating a resource to a UE that supports 256 QAM demodulation. The BS may include: a radio frequency (RF) receiver to receive a CQI report from the UE; and a processor to determine whether a backoff of transmit power has been applied to a downlink subframe in which CQI is measured by the UE, to determine whether a backoff of transmit power is to be applied to a downlink subframe in which resource allocation is to be performed, and to determine an MCS level based on the CQI and determining results.

According to the disclosure of the present invention, the foregoing problem of the conventional technology is solved.

DESCRIPTION OF EXEMPLARY EMBODIMENTS

Figure 1:
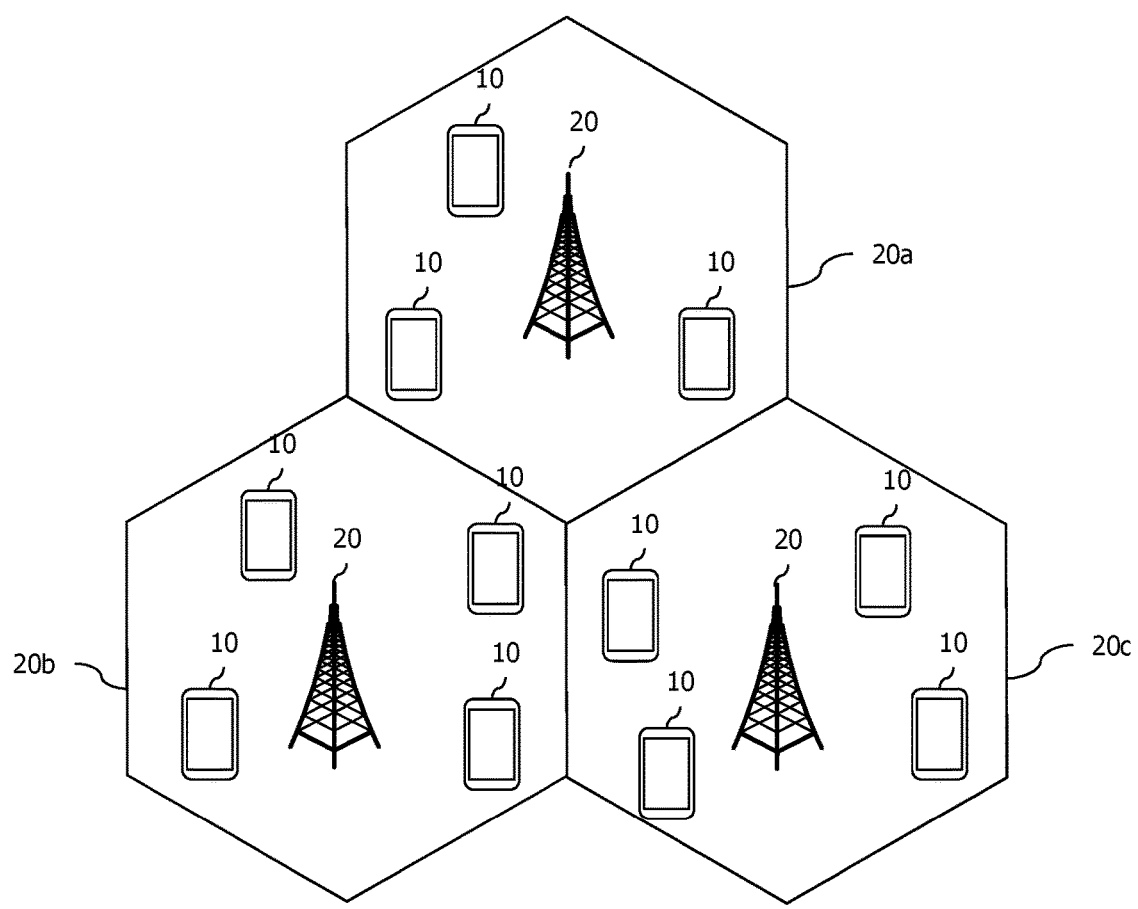
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UEl 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
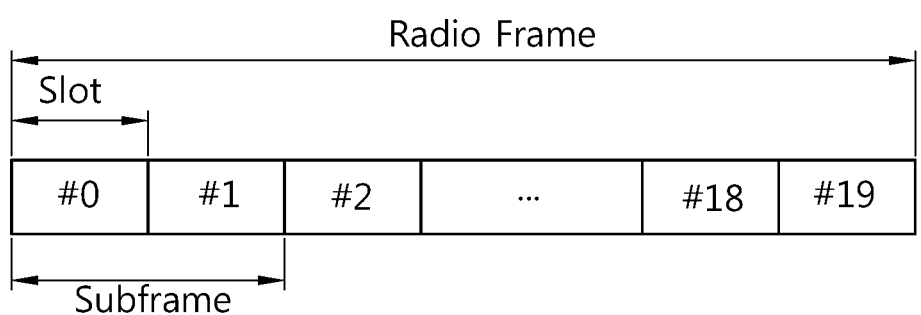
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
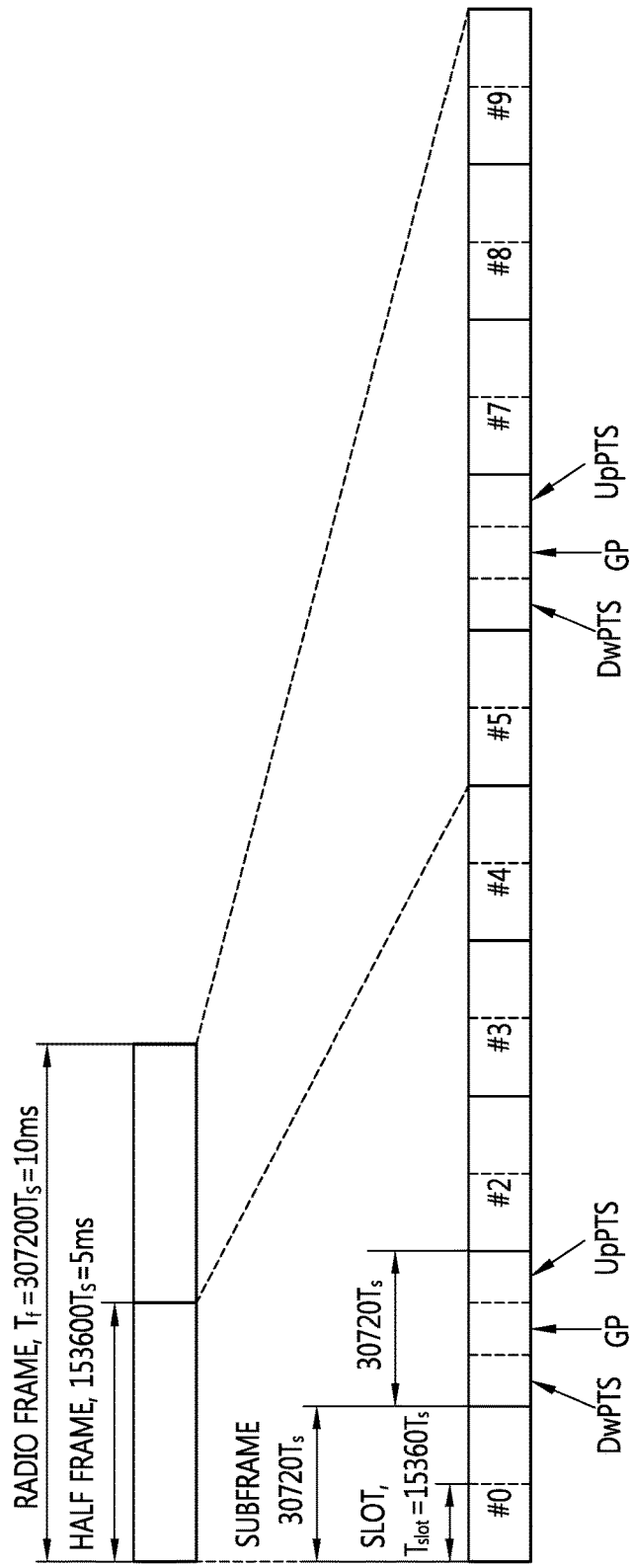
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS(Downlink Pilot Time Slot: DwPTS), a GP(Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| | Normal CP in downlink | | | Extended CP in downlink | | |
|---|---|---|---|---|---|---|
| | | UpPTS | | | UpPTS | |
| Special subframe configuration | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

Figure 4:
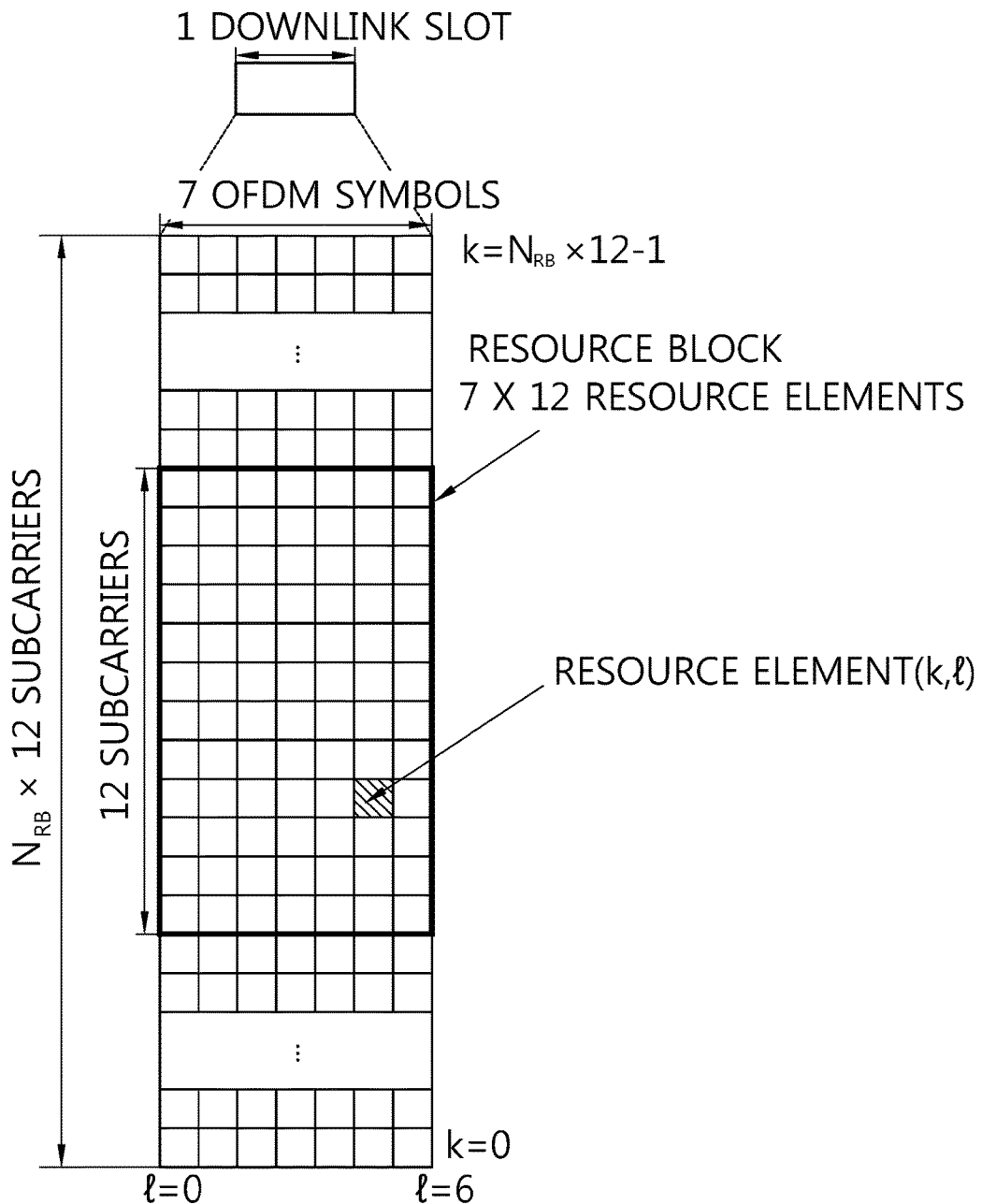
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
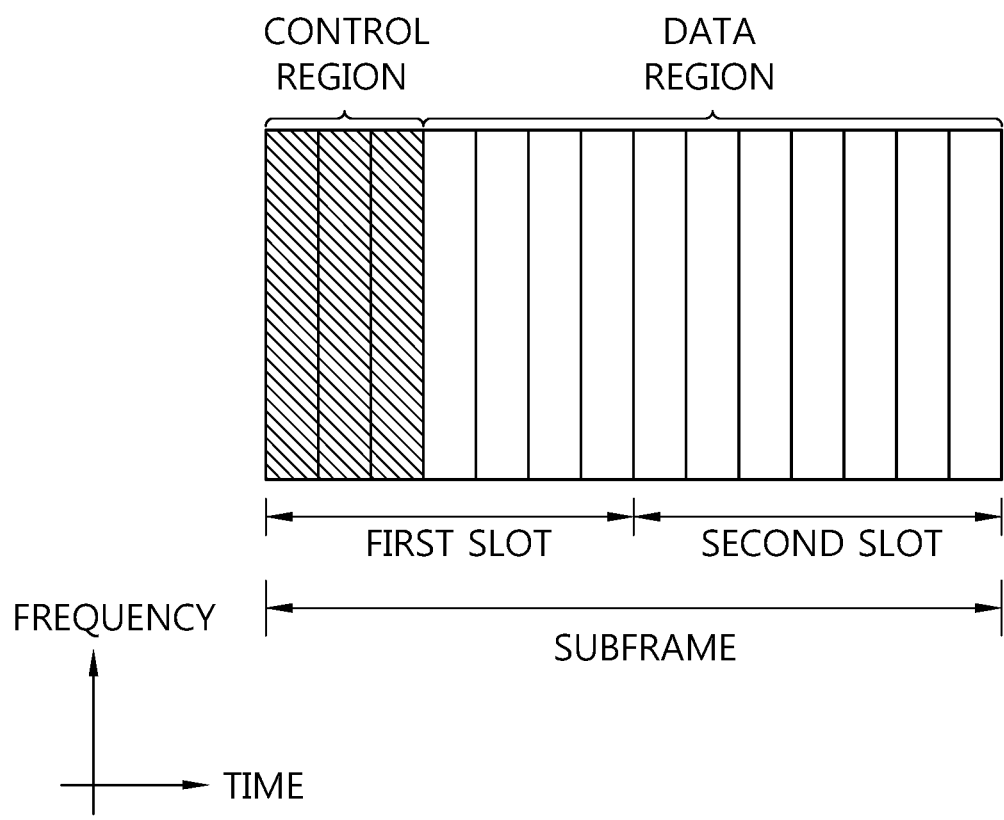
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
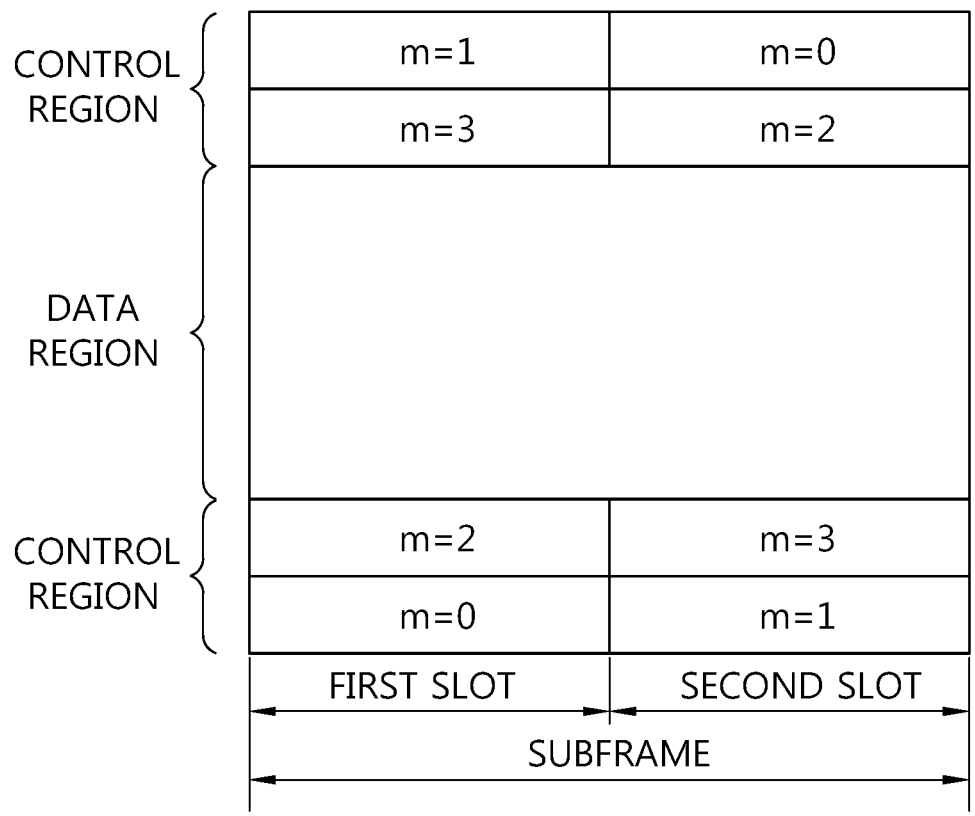
FIG. 6. illustrates a structure of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation (CA>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

Carrier aggregation systems may be divided into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both a case where component carriers are contiguous and a case where component carriers are non-contiguous. Different numbers of component carriers may be aggregated for a downlink and an uplink. A case where the number of downlink component carriers and the number of uplink component carriers are the same is referred to as symmetric aggregation, and a case where the numbers are different is referred to as asymmetric aggregation.

When one or more component carriers are aggregated, component carriers to be aggregated may use the same bandwidths as adopted in an existing system for backward compatibility with the existing system. For example, the 3GPP LTE system supports bandwidths of 1.4 MHz, 3 MHz, 5 MHz, 10 MHz, 15 MHz, and 20 MHz, and the 3GPP LTE-A system may configure a broad band of 20 MHz or more only using the bandwidths of the 3GPP LTE system. Alternatively, instead of using the bandwidths of the existing system, new bandwidths may be defined to configure a broad band.

In order to transmit/receive packet data through a specific secondary cell in carrier aggregation, a UE first needs to complete configuration for the specific secondary cell. Here, configuration means that reception of system information necessary for data transmission/reception in a cell is completed. For example, configuration may include an overall process of receiving common physical-layer parameters necessary for data transmission and reception, media access control (MAC)-layer parameters, or parameters necessary for a specific operation in an RRC layer. A configuration-completed cell is in a state where packet transmission and reception is immediately possible upon receiving information indicating packet data may be transmitted.

A configuration-completed cell may be in an activated or deactivated state. Here, the activated state means that the cell performs data transmission or reception or is ready for data transmission or reception. A UE may monitor or receive a control channel (PDCCH) and a data channel (PDSCH) of an activated cell in order to identify resources (which may be a frequency or time) assigned thereto.

The deactivated state means that transmission or reception of traffic data is impossible and measurement or transmission/reception of minimal information is possible. A UE may receive system information (SI) necessary for receiving a packet from a deactivated cell. However, the UE does not monitor or receive a control channel (PDCCH) and data channel (PDSCH) of the deactivated cell in order to identify resources (which may be a frequency or time) assigned thereto.

<Introduction of Small Cell>

Meanwhile, in a next-generation mobile communication system, it is expected that a small cell having a small cell coverage radius is added in the coverage of a legacy cell and that the small cell handles a greater amount of traffic. The legacy cell has a greater coverage than that of the small cell, and thus is also referred to as a macro cell, which is described with reference to FIG. 7.

Figure 7:
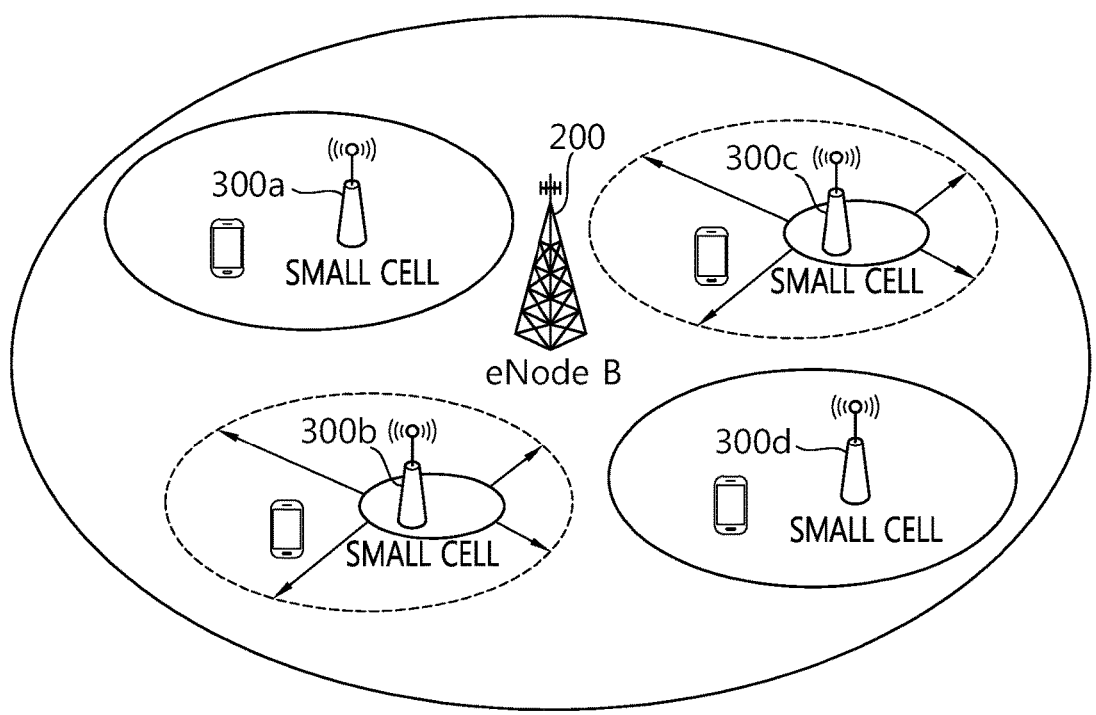
FIG. 7 illustrates a heterogeneous network environment in which a macro cell and a small cell coexist and which is possibly used in a next-generation wireless communication system.

FIG. 7 illustrates a heterogeneous network environment in which a macro cell and a small cell coexist and which is possibly used in a next-generation wireless communication system.

FIG. 7 shows a heterogeneous network environment in which a macro cell of a legacy BS 200 overlaps with one or more small cells of small BSs 300a, 300b, 300c, and 300d. The legacy BS provides a greater coverage than the small BSs and thus is also referred to as a macro BS (macro eNodeB (MeNB)). In the present specification, the macro cell and the MeNB may be used together. A UE having access to the macro cell 200 may be referred to as a macro UE. The macro UE receives a downlink signal from the MeNB and transmits an uplink signal to the MeNB.

In this heterogeneous network, coverage holes of the macro cell may be filled by configuring the macro cell as a primary cell (Pcell) and by configuring the small cells as secondary cells (Scells). In addition, overall performance may be boosted by configuring the small cells as Pcells and by configuring the macro cell as a Scell <Device-to-device (D2D) Communication>

Meanwhile, device-to-device (D2D) communication expected to be adopted in a next-generation communication system will be described hereinafter.

Figure 8:
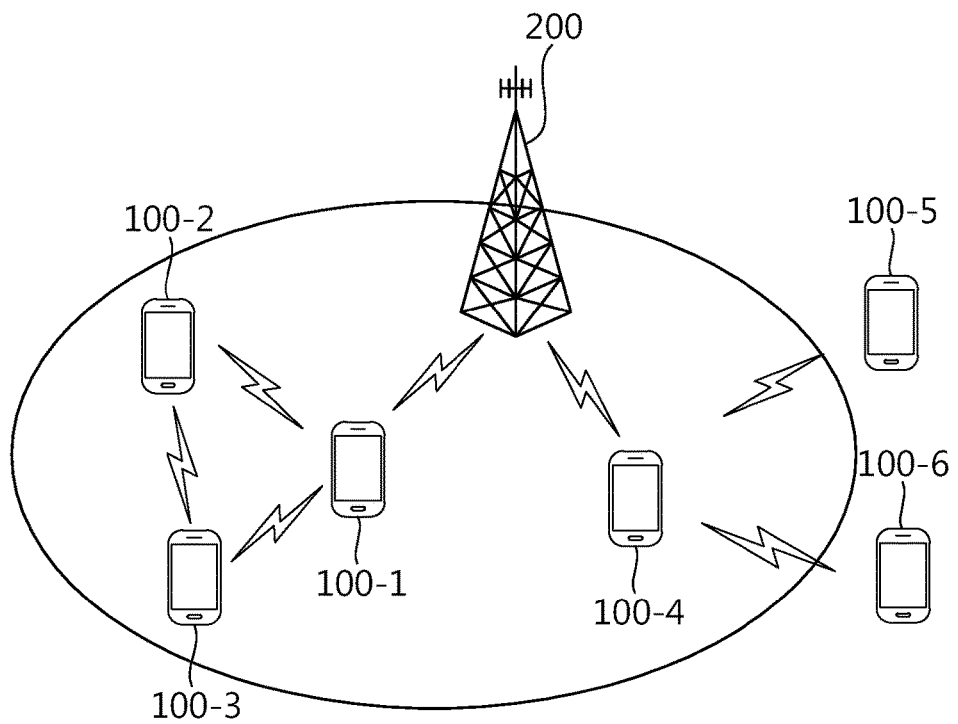
FIG. 8 illustrates the concept of D2D communication expected to be adopted in a next-generation communication system.

FIG. 8 illustrates the concept of D2D communication expected to be adopted in a next-generation communication system.

With growing users' demands for social network services (SNSs), communication between physically adjacent UEs, that is, D2D communication, is required. D2D communication is based on discovery between UEs.

To meet the foregoing demands, as illustrated in FIG. 8a, methods for enabling direct communications between UE#1 100-1, UE#2 100-2, and UE#3 100-3 or direct communications between UE#4 100-4, UE#5 100-5, and UE#6 100-6 without involvement of an eNodeB 200 are being discussed. Direct communication between UE#1 100-1 and UE#4 100-4 is also possible with the aid of the eNodeB 200. Meanwhile, UE#1 100-1 may serve as a relay for UE#2 100-2 and UE#3 100-3. Likewise, UE#4 100-4 may serve as a relay for UE#5 100-5 and UE#6 100-6, which are distant from the center of a cell.

Thus, it is discussed to adopt D2D communication between UEs in a next-generation system.

<Introduction of 256 QAM>

In LTE/LTE-A, binary phase shift keying (BPSK), quadrature phase shift keying (QPSK), 16 quadrature amplitude modulation (QAM), and 64Q AM are used as modulation schemes. However, in a next-generation communication system, the introduction of a small call or D2D communication leads to a decrease in communication distance, and accordingly the state of a radio channel is expected to become better. Thus, to optimize the efficiency of the radio channel, it is required to use high-order modulation, for example, 256 QAM.

However, although it is recognized that 256 QAM can be supported only in a small cell due to limitations of RF technology, it is required to support 256 QAM at least in a restrictive manner through various attempts for a base station having greater transmission power than a small-cell base station.

Generally, the transmit (Tx) error vector magnitude (EVM) of a BS is required to be 3 to 4% in order to support 256 QAM in a downlink. Here, the Tx EVM has a high correlation with the RF output of the BS, and a greater RF output causes loss in terms of EVM. Power classes of BSs according to LTE/LTE-A are defined in 3GPP TS 36.104 and are listed in the following table for convenience.

TABLE 3

| BS class | PRAT |
| --- | --- |
| Wide-area BS | |
| Medium-range BS | <+38 dBm |
| Local-area BS | <+24 dBm |
| Home BS | <+20 dBm (for one transmit antenna port) |
| | <+17 dBm (for two transmit antenna ports) |
| | <+14 dBm (for four transmit antenna ports) |
| | <+11 dBm (for eight transmit antenna ports) |

The Tx EVMs of BSs according to LTE/LTE-A are defined in 3GPP TS 36.104 and are listed in the following table for convenience.

TABLE 4

| Modulation scheme for PDSCH | Required EVM [%] |
| --- | --- |
| QPSK | 17.5% |
| 16QAM | 12.5% |
| 64QAM | 8% |

Considering the current RF technology, a BS having an RF output of 24 dBm or less can generally achieve a Tx EVM of 3 to 4%. Thus, in the current LTE/LTE-A standard, only a home BS or a local-area BS can have a Tx EVM of 3 to 4% and thus can support 256 QAM.

However, a BS having an RF output exceeding 24 dBm cannot obtain a Tx EVM of 3 to 4% and thus cannot support 256 QAM. Accordingly, the following options are provided to support 256 QAM.

a) Use of High-linearity RF Amplifier b) Application of New Backoff to Downlink Transmission Power However, when a high-linearity RF amplifier is used as in option a, deterioration in power efficiency causes an increase in power consumption and an additional high-capacity/expensive RF element is needed, resulting in a cost increase.

Further, in b, a BS is not allowed to perform a separate backoff on a downlink according to the current LTE/LTE-A standard. More specifically, according to the current LTE/LTE-A standard, the BS always transmits a CRS with fixed power. Further, the BS notifies a UE of information on the level of the fixed power via system information or through a high-layer signal (for example an RRC signal). Specifically, the BS broadcasts the information on the level of the fixed power, which is included in a second system information block (SIB), for example, in a referenceSignalPower information element (IE) in SIB2, as in the following table.

TABLE 5

PDSCH-ConfigCommon ::= SEQUENCE {
referenceSignalPower INTEGER (−60..50),
p-b INTEGER (0..3),
}

The UE directly measures receive power for the CRS, subtracts the level of the directly measured receive power from the level of power acquired from referenceSignal-Power to calculate a downlink path loss value, and determines PUSCH transmit power using the path loss value.

Therefore, when the BS applies a backoff to the entire downlink, the backoff is also applied to the transmit power for the CRS, causing a problem. Specifically, when the backoff is applied to the transmit power for the CRS, received signal received power (RSRP) on a subframe in which the CRS is received decreases in proportion to the level of the backoff, and accordingly a pass loss value is excessively estimated from the RSRP. In this case, the UE determines an excessive transmit power for an uplink channel, for example, a PUSCH, based on the excessively estimated path loss, resulting in unnecessary waste of transmit power and thus causing battery consumption of the UE and increasing interference with an adjacent UE. Further, a reduced RSRP estimate generally causes impact on radio resource management of the BS including mobility control.

When the BS applies a backoff only to a data channel, instead of to the entire downlink, to solve the foregoing problem, another problem occurs. Specifically, the UE has a problem in demodulating a downlink channel, for example, a PDSCH. In detail, the current LTE/LTE-A standard supports modulation/demodulation schemes of QPSK/16QAM/64QAM, and QAM modulation/demodulation schemes, which simultaneously transmit phase information and size information on receiving symbols, unlike existing PSK modulation/demodulation schemes, always requires coherent demodulation. To perform coherent demodulation, both an estimate of a channel and the power ratio of a data symbol to a reference signal (RS) are always required. To this end, the BS signals information on the power ratio of a symbol used for a PDSCH to the CRS to the UE in the current standard. Specifically, the BS transmits the information on the power ratio of the symbol used for the PDSCH to the CRS, expressed as p-a and p-b, to the UE. Here, p-a denotes a power offset between the CRS and the PDSCH in an OFDM symbol including the CRS among OFDM symbols in one subframe. p-a is included in a high message of PDSCH-ConfiDedicated illustrated in the following table and is set up through an RRC (Re)Configuration process.

TABLE 6

PDSCH-ConfigDedicated::= SEQUENCE {
p-a ENUMERATED {
dB-6, dB-4dot77, dB-3, dB-1dot77,
dB0, dB1, dB2, dB3}
}

Meanwhile, p-b denotes a power offset of a PDSCH between an OFDM symbol including the CRS and an OFDM symbol including no CRS and is transmitted to the UE in the entire cell via SIB2 through the foregoing message of PDSCH-ConfigCommon.

Although the BS may control a power ratio to be applied to data through p-a/p-b, p-a/p-b neither is expressed based on a subframe nor is transmitted to the UE on a regular period, and thus it is difficult for the BS to apply a backoff and to notify the UE of the backoff through p-a/p-b. In particular, p-b is transmitted, being included in an SIB, and thus is statically applied the same to the entire cell, and p-a is not changed until an RRC reconfiguration procedure is performed. Thus, it is hard to transmit information on a backoff changing as necessary and the range of an applicable backoff is limited.

<Solution in the Present Specification>

Accordingly, the present invention proposes a method of supporting 256 QAM through a backoff dynamically controlled in coexistence with a legacy LTE/LTE-A UE. A detailed operation of the present invention is as follows.

First, to support 256 QAM, a backoff-needed (high-capacity) BS (for example, a macro-cell BS) additionally transmits a signal (for example, PDSCH-ConfigCommon) including backoff information (for example, BOfor256QAM-r12) for 256 QAM. One example of PDSCH-ConfigCommon is illustrated below.

TABLE 7

PDSCH-ConfigCommon ::= SEQUENCE {
referenceSignalPower INTEGER (−60..50),
p-b INTEGER (0..3),
BOfor256QAM-r12 INTEGER (AA..BB)
}

In the above table, AA and BB are numbers to indicate a backoff range.

The BS transmits PDSCH-ConfigCommon to a UE that supports 256QAM and thus is capable of applying BOfor256QAM-r12 as follows.

i) The BS enters a backoff value required from an RF terminal of the BS to the backoff information (for example, BOfor256QAM-r12) for 256 QAM in order to satisfy Tx EVM needed for 256 QAM and broadcasts system information (for example, SIB2) including the backoff information in a corresponding cell.

ii) The BS may perform resource allocation in a time division manner for a legacy UE such that subframes are classified into QPSK/16QAM/64QAM applying subframes (Type A subframes) and QPSK/256QAM applying subframes (Type B subframes), which is described as follow with reference to a drawing.

Figure 9:
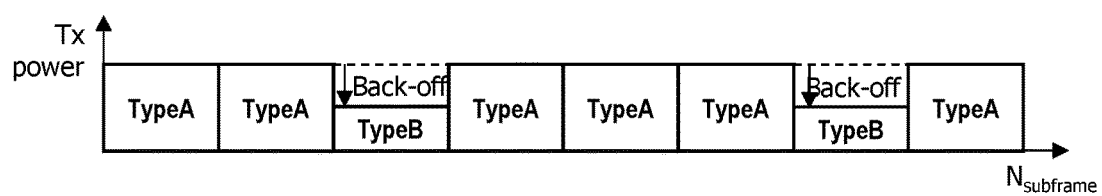
FIG. 9 illustrates subframes based on a solution according to one disclosure of the present specification.

FIG. 9 illustrates subframes based on the solution according to one disclosure of the present specification.

FIG. 9 shows QPSK/16QAM/64QAM applying subframes (Type A subframes) and QPSK/256QAM applying subframes (Type B subframes) for a legacy UE.

For the convenience of description, UEs may be classified according to a scheduled UE type as follows.

$UE_A$: Legacy UE using a first transmission mode (TM1) to a sixth transmission mode (TM6) using CRS-based channel estimation (QPSK/16QAM/64QAM).

$UE_B$: Legacy UE using a seventh transmission mode (TM7) to a tenth transmission mode (TM10) using DMRS-based channel estimation (QPSK/16QAM/64QAM).

$UE_C$: Legacy UE using the seventh transmission mode (TM7) to the tenth transmission mode (TM10) using DMRS-based channel estimation (QPSK/16QAM/64QAM/256QAM).

$UE_D$: Legacy UE using the first transmission mode (TM1) to the sixth transmission mode (TM6) using CRS-based channel estimation (QPSK).

$UE_E$: using the first transmission mode (TM1) to a new sixth transmission mode (TM6) using CRS-based channel estimation (QPSK/16QAM/64QAM/256QAM)

Resource allocation for $UE_A$ and $UE_B$ is performed on a Type A subframe.

Resource allocation for $UE_B/UE_C/UE_D/UE_E$ is performed on a Type B subframe. Here, since $UE_B/UE_C$ uses DMRS-based channel estimation and a backoff is also applied to a DMRS in the subframe, there is no problem. $UE_C$ supporting 256QAM can additionally use BOfor256QAM-r12 transmitted from the BS. $UE_D$ does not know the value of BOfor256QAM-r12 applied to the subframe but has no problem in performing demodulation due to characteristics of the QPSK modulation scheme. Since $UE_E$ sets new p-a/p-b from previously received p-a/p-b to perform demodulation based on BOfor256QAM-r12 transmitted from the BS of the corresponding cell, $UE_E$ has no problem in coherent detection and thus may use all modulation/demodulation techniques of QPSK/16QAM/64QAM/256QAM.

In a subframe supporting 256QAM, since it is impossible to apply a backoff to a basic channel (PSSH/SSCH/PBCH) which has impact on a service area of a cell, applying a backoff needs to be avoided if possible. When applying 256 QAM according to the foregoing method, an OFDM symbol including no CRS in the subframe may satisfy an EVM condition through a backoff. In the case of an OFDM symbol including the CRS, although interference still remains through the CRS to which the backoff is not applied, a new backoff value is applied to channels other than the CRS and there are only four OFDM symbols including the CRS among total 14 OFDM symbols in the current LTE/LTE-A standard, among which only three OFDM symbols are present in a data region, and thus signal deterioration in the OFDM symbols through the CRS may be limited to some degree.

Meanwhile, a backoff value proposed in the present invention is applied as follow in view of channel quality information (CQI). First, since transmit power of the BS is decreased by the backoff value in a Type B subframe, the SNR of a data channel is also linearly reduced by the backoff in the subframe. Thus, when the BS allocates a resource to a UE through CQI reported by the UE, the BS performs the following process using $CQI_{shift}$ that is proportionate to a backoff set in advance, which is described with reference to a drawing.

Figure 10:
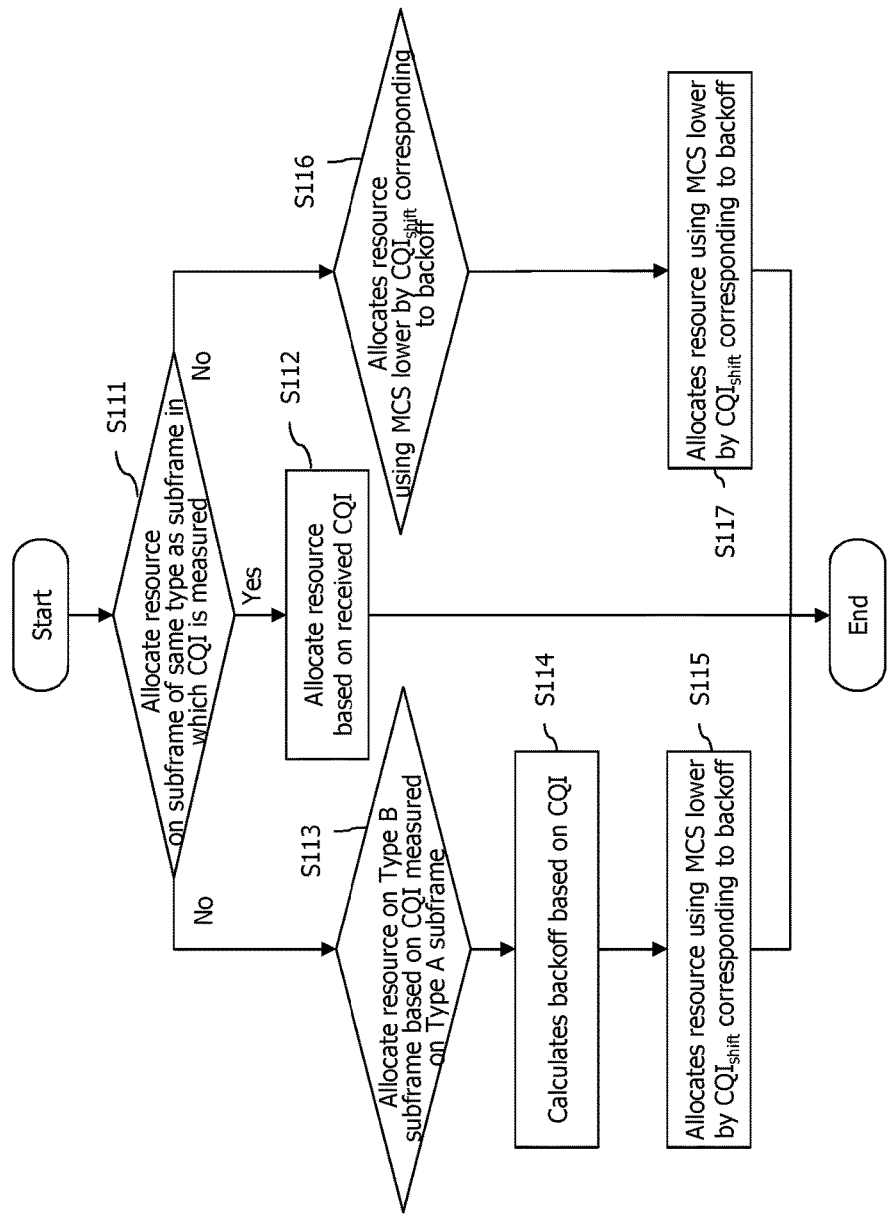
FIG. 10 is a flowchart illustrating a resource allocation method based on the solution according to one disclosure of the present specification.

FIG. 10 is a flowchart illustrating a resource allocation method based on the solution according to one disclosure of the present specification.

First, the BS determines whether to allocate a resource on a subframe of the same type as a subframe where CQI is measured by a UE (S111). In this case, the BS performs resource allocation based on the measured and reported CQI (S112).

$$MCS_{scheduled}=CQItoMCS(CQI_{meashred}) \quad \text{[Equation 1]}$$

Here, CQItoMCS(x) denotes a function mapping a modulation coding scheme (MCS) from measured and reported CQI.

Meanwhile, the BS determines whether to allocate a resource on a Type B subframe based on CQI measured and reported on a Type A subframe (S113). In this case, the BS calculates a backoff based on the CQI measured and reported by the UE on the Type A subframe (S114) and allocates a resource to the UE on the Type B subframe using an MCS that is lower by $CQI_{shift}$ corresponding to the calculated backoff (S115).

$$MCS_{scheduled}=CQItoMCS(CQI_{meashred}-CQI_{shift}) \quad \text{[Equation 2]}$$

Meanwhile, the BS determines whether to allocate a resource on a Type A subframe based on CQI measured and reported on a Type B subframe (S116). In this case, the BS calculates a backoff based on the CQI measured and reported on the Type B subframe (S117) and allocates a resource to the UE on the Type B subframe using an MCS that is higher by $CQI_{shift}$ corresponding to the calculated backoff (S118).

$$MCS_{scheduled}=CQItoMCS(CQI_{meashred}+CQI_{shift}) \quad \text{[Equation 3]}$$

According to the foregoing process, a UE supporting 256 QAM detects whether a backoff inferred through 256 QAM scheduling is applied and applies a separately transmitted backoff value accordingly, thereby enabling 256 QAM transmission in coexistence of a legacy UE.

The aforementioned embodiments of the present invention can be implemented through various means. For example, the embodiments of the present invention can be implemented in hardware, firmware, software, combinations thereof, etc. Details thereof will be described with reference to the drawing.

Figure 11:
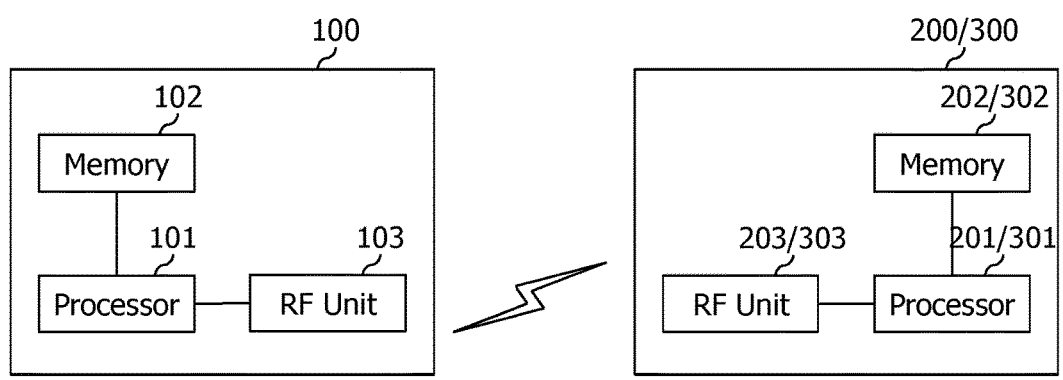
FIG. 11 is a block diagram of a wireless communication system according to a disclosure of the present specification.

FIG. 11 is a block diagram of a wireless communication system according to a disclosure of the present specification.

ABS 200/300 includes a processor 201/301, a memory 202/302, and a radio frequency (RF) unit 203/303. The memory 202/302 is coupled to the processor 201/301, and stores a variety of information for driving the processor 201/301. The RF unit 203/303 is coupled to the processor 201/301, and transmits and/or receives a radio signal. The processor 201/301 implements the proposed functions, procedures, and/or methods. In the aforementioned embodiment, an operation of the BS may be implemented by the processor 201/301

A UE 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods.

The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing resource allocation by a base station (BS) to a user equipment (UE) that supports 256 quadrature amplitude modulation (QAM) demodulation, the method comprising:
   receiving, by the BS, a channel quality information (CQI) from the UE;
   determining, by the BS, that a first backoff of transmit power has been applied to a first downlink subframe in which the received CQI is measured by the UE;
   determining, by the BS, that a second backoff of transmit power is to be applied to a second downlink subframe in which the resource allocation is to be performed;
   determining, by the BS, a modulation coding scheme (MCS) level based on the CQI, the determination that the first backoff has been applied, and the determination that the second backoff of transmit power is to be applied; and
   performing, by the BS, the resource allocation to the UE on the second downlink subframe based on the determined MCS level,
   wherein, based on (i) that the first backoff of the transmit power has not been applied to the first downlink subframe and based on (ii) that the second backoff of transmit power is to be applied to the second downlink subframe, the resource allocation to the UE on the second downlink subframe is performed based on a lower MCS level, and
   wherein, based on (i) that the first backoff of the transmit power has been applied to the first downlink subframe and based on (ii) that the second backoff of transmit power is not to be applied to the second downlink subframe, performing the resource allocation to the UE on the second downlink subframe based on a higher MCS level.

2. The method of claim 1, the determining of the MCS level comprising:
   calculating a backoff value of the second backoff based on the received CQI;
   determining an offset in CQI based on the backoff value of the second backoff; and
   determining the lower MCS level based on the offset in CQI when the first backoff of the transmit power has not been applied to the first downlink subframe and the second backoff of transmit power is to be applied to the second downlink subframe.

3. The method of claim 1, the determining of the MCS level comprising:
   determining an offset in CQI based on a backoff value of the first backoff; and
   determining the higher MCS level based on the offset in CQI.

4. A base station (BS) for performing resource allocation to a user equipment (UE) that supports 256 quadrature amplitude modulation (QAM) demodulation, the BS comprising:
   a transceiver; and
   a processor operatively connected to the transceiver, wherein the processor is confiured to:
      control the transceiver to receive a channel quality information (CQI) from the UE,
      determine that a backoff of transmit power has been applied to a downlink subframe in which the received CQI is measured by the UE,
      determine that a second backoff of transmit power is to be applied to a second downlink subframe in which the resource allocation is to be performed,
      determine a modulation coding scheme (MCS) level based on the received CQI, the determination that the first backoff has been applied, and the determination that the second backoff of transmit power is to be applied, and
      perform the resource allocation to the UE on the second downlink subframe based on the determined MCS level,
      wherein, based on (i) that the first backoff of the transmit power has not been applied to the first downlink subframe and based on (ii) that the second backoff of transmit power is to be applied to the second downlink subframe, the resource allocation to the UE on the second downlink subframe is performed based on a lower MCS level, and
      wherein, based on (i) that the first backoff of the transmit power has been applied to the first downlink subframe and based on (ii) that the second backoff of transmit power is not to be applied to the second downlink subframe, perform the resource allocation to the UE on the second downlink subframe based on a higher MCS level.

5. The BS of claim 4, wherein the processor is further configured to:
   calculate a backoff value of the second backoff based on the received CQI,
   determine an offset in CQI based on the backoff value of the second backoff, and
   determine the lower MCS level based on the offset in CQI when the first backoff of the transmit power has not been applied to the first downlink subframe and the second backoff of transmit power is to be applied to the second downlink subframe.

6. The BS of claim 4, wherein the processor is further configured to:
   determine an offset in CQI based on a backoff value of the first backoff, and
   determine a higher MCS level based on the offset in CQI.

* * * * *